United States Patent [19]
Larson et al.

[11] Patent Number: 5,781,373
[45] Date of Patent: Jul. 14, 1998

[54] ACOUSTIC NOISE REDUCTION SYSTEM FOR A DISK DRIVE

[75] Inventors: Nils Eric Larson, San Jose; Ajit Fathailal Sancheti, Redwood City, both of Calif.

[73] Assignee: Western Digital Corporation, Irvine, Calif.

[21] Appl. No.: 816,099

[22] Filed: Mar. 14, 1997

[51] Int. Cl.⁶ .................................................. G11B 33/08
[52] U.S. Cl. ................................. 360/97.02; 369/263
[58] Field of Search ........................... 360/97.01, 97.02, 360/98.01, 99.08, 98.07; 361/685; 369/263

[56] References Cited

U.S. PATENT DOCUMENTS

| | | | |
|---|---|---|---|
| 4,979,062 | 12/1990 | Stefansky et al. | 360/97.02 |
| 5,131,619 | 7/1992 | Daugherty et al. | 248/635 |
| 5,214,549 | 5/1993 | Baker et al. | 360/97.02 |
| 5,282,100 | 1/1994 | Tacklind et al. | 360/97.02 |
| 5,376,850 | 12/1994 | Elsing et al. | 310/67 R |
| 5,461,268 | 10/1995 | Sanada | 310/51 |
| 5,477,401 | 12/1995 | Squires et al. | 360/97.02 |
| 5,483,398 | 1/1996 | Boutaghou | 360/97.02 |
| 5,587,855 | 12/1996 | Kim | 360/97.02 |

FOREIGN PATENT DOCUMENTS

| | | | |
|---|---|---|---|
| 90/05982 | 5/1990 | WIPO | 360/97.02 |

*Primary Examiner*—Stuart S. Levy
*Assistant Examiner*—Kevin M. Watkins
*Attorney, Agent, or Firm*—Leo J. Young; W. Chris Kim; Milad G. Shara

[57] ABSTRACT

A noise suppression system for use in a disk drive. The system isolates the interface between the disk drive cover and the moving parts of the disk drive to attenuate acoustic energy introduced by the moving parts and also dissipates some of the unwanted acoustic energy in viscoelastic damping layers. An outer plate made of a rigid layer covered with a viscoelastic damping layer is disposed over an inner cover in which is provided an open region surrounding the pivot axis of the head-stack assembly (HSA) or, alternatively, surrounding both the pivot axis and the spindle axis of the disk assembly. A rigid interface member is fixed to the pivot journal or, alternatively, to both the pivot journal and the spindle journal within the open region. The outer plate is fitted to the periphery of the inner cover so that the viscoelastic damping layer abuts a flexible sealing member fitted over the interface member and inner cover around the open region. The sealing member includes a soft metal substrate for sealing the head-disk assembly (HDA) chamber of the disk drive. The viscoelastic damping and adhesive layers are constrained between the outer plate and the sealing member to isolate the interface member from the outer plate within the open region of the inner cover. Any acoustic energy introduced into the interface member is at least partially dissipated by shear wave losses within the constrained viscoelastic layer.

7 Claims, 4 Drawing Sheets es,781,373

ACOUSTIC NOISE REDUCTION SYSTEM FOR A DISK DRIVE

BACKGROUND OF THE INVENTION

1. Field of the Invention

This invention relates generally to disk drives and particularly to an acoustic noise reduction system for the housing of such a disk drive.

2. Description of the Related Art

A computer system usually includes one or more disk drives for economical, non-volatile data storage. A disk drive typically includes a housing formed by fitting a cover to a base to create a sealed head-disk assembly (HDA) chamber. The HDA includes one or more disks stacked in a spaced-apart relationship on a spindle motor hub. The spindle motor includes a stationary element such as a spindle journal fixed to the disk drive housing (at the base and cover) to define and stabilize a spindle axis about which the disk rotates. Each disk surface is coated with a thin magnetic film. These magnetic surfaces each spin about the spindle axis in proximity to a read/write head that is disposed by means of a head gimbal assembly (HGA) attached to an actuator arm. The actuator arm is part of a head stack assembly (HSA) that turns about a pivot bearing assembly, which includes a stationary element such as a pivot journal that is fixed to the disk drive housing (at the base and cover) to define and stabilize a pivot axis for the HSA. Typically, the pivot bearing assembly and spindle motor journals are rigidly coupled at the top (cover) and bottom (base), thereby fixing and stabilizing the relationship of the two axes to control head positioning error.

The arms move in response to energizing a voice coil motor (VCM) to move the HSA on the pivot axis, thereby swinging each of the arms to move the associated head over the associated disk surface. When moved in this manner during normal operation, the HSA tends to vibrate at some frequencies. The spindle motor, rapidly spinning the disks, contributes additional vibration. Vibration from the spindle motor and VCM actions may be transmitted to the disk drive housing through the pivot and spindle journals. The resulting vibration in the housing causes radiation of acoustic noise, especially from the cover which, having a relatively large vibrating surface, may act as a speaker cone. Such acoustic noise may be annoying and may suggest poor quality to the user. Clearly, this is disadvantageous and gives rise to a clearly-felt need in the art for a housing arrangement that reduces acoustic noise by minimizing vibration energy transferred to the cover from the voice coil and spindle motors.

There is a marked decrease in human sensitivity to acoustic noise below about 200 Hz and above about 6000 Hz. Thus, it is clearly advantageous to attenuate acoustic noise radiated from disk drives in the frequency range from about 200 Hz to about 4000 Hz. It would be a useful advancement in the art to provide a disk drive with a cover that is decoupled from VCM and spindle motor vibrations through some means for attenuating acoustic noise between 200 Hz and 6000 Hz while maintaining the necessary rigid coupling between the motor journals.

The prior art is replete with attempts to reduce vibration induced acoustic noise radiation from a disk drive. For example, U.S. Pat. No. 5,282,100 to Tacklind et al., describes a disk drive with a base casting and a rigid inner cover having integral raised plateau regions defining motor interfaces around a spindle motor area and around a rotary actuator area. The Tacklind et al. disk drive includes an outer cover that is isolated from the inner cover at the periphery by adhesive-coated foam rubber. The outer cover is further isolated from the inner cover by openings which encircle the raised plateau regions and by an air gap between the inner and outer cover surface areas. The inner cover is in direct contact with the rotary actuator and the spindle motor through the integral raised plateau regions that are fixedly-attached to the actuator and spindle. Despite being isolated from the outer cover, the inner cover itself is a large structure having an overall length and width almost equal in size to the base. Therefore, any inner cover vibration can radiate significant acoustic noise levels, particularly from the raised plateau regions which are directly exposed.

Another example is U.S. Pat. No. 5,461,268 to Sanada, which discloses a noise dampening system in which two O-rings made of a compliant material, e.g. rubber or resin, are captured between the armature and shaft of a disk drive spindle motor. However, the disclosed system does not affect vibrational noise introduced by the VCM, which is a significant contributor of acoustic vibration energy.

Also, U.S. Pat. No. 5,376,850 to Elsing et al. teaches interposing a plurality of resilient toroidal rings between the stator element of the spindle motor and the base attachment member. Once again, vibration noise from the HSA is not considered.

Finally, U.S. Pat. No. 5,483,398 issued to Boutaghou teaches a vibration-isolation assembly wherein either the spindle motor or the actuator assembly are each isolated from a primary housing base and from each other by coupling through separate compliant structures. The resulting base structure is relatively complex, requiring multiple castings and assembly processes, and does not address a cover structure to further attenuate noise.

There is a need therefore, to provide a disk drive having an improved means for acoustic noise reduction which addresses noise from both HSA and spindle motor structures

SUMMARY OF THE INVENTION

This invention may be characterized as a disk drive having reduced operational acoustic noise including a base and an inner cover joined to the base to form a head-disk assembly (HDA) chamber. The inner cover includes a first layer of rigid material with an open region therein bounded by an edge. The disk drive further includes a pivot bearing assembly having a pivot journal that is fixed to the base to define a pivot axis disposed within the open region of the inner cover. A head stack assembly is rotatably supported by the pivot bearing assembly. An interface member having a free end is disposed within the open region substantially coplanar to the first rigid material layer and is fixed to the pivot journal. The disk drive also includes an outer plate, fixed to the inner cover, and a soft metal member disposed between the interface member and the outer plate. The outer plate includes a second layer of rigid material and a layer of viscoelastic material is constrained between the second layer of rigid material and the soft metal member to dissipate acoustic vibration from the interface member.

One embodiment of the disk drive of this invention is configured so that the interface member is included in the first rigid material layer. In this embodiment, the interface member extends for a length L into the open region from the edge thereof. The interface member extends to define a free end affixed to the pivot stationary member. The interface member has a first width $w_1$ at a proximate end adjacent the open region edge and a second width $w_2$ at a distal end adjacent the pivot. The length L is more than twice the first width $w_1$ and more than twice the second width $w_2$.

In a preferred embodiment, the soft metal member comprises fully-annealed aluminum foil.

In another preferred embodiment, the outer plate includes a first aperture for receiving therethrough a first fastener for fixing the interface member to the pivot journal and a second aperture for receiving therethrough a second fastener for fixing the interface member to the spindle journal.

The foregoing, together with other features and advantages of this invention, are more fully disclosed in the following specification, claims and the accompanying drawings.

BRIEF DESCRIPTION OF THE DRAWING

For a more complete understanding of this invention, reference is now made to the following detailed description of the embodiments illustrated in the accompanying drawing, wherein.

DESCRIPTION OF A PREFERRED EMBODIMENT

Figure 1:
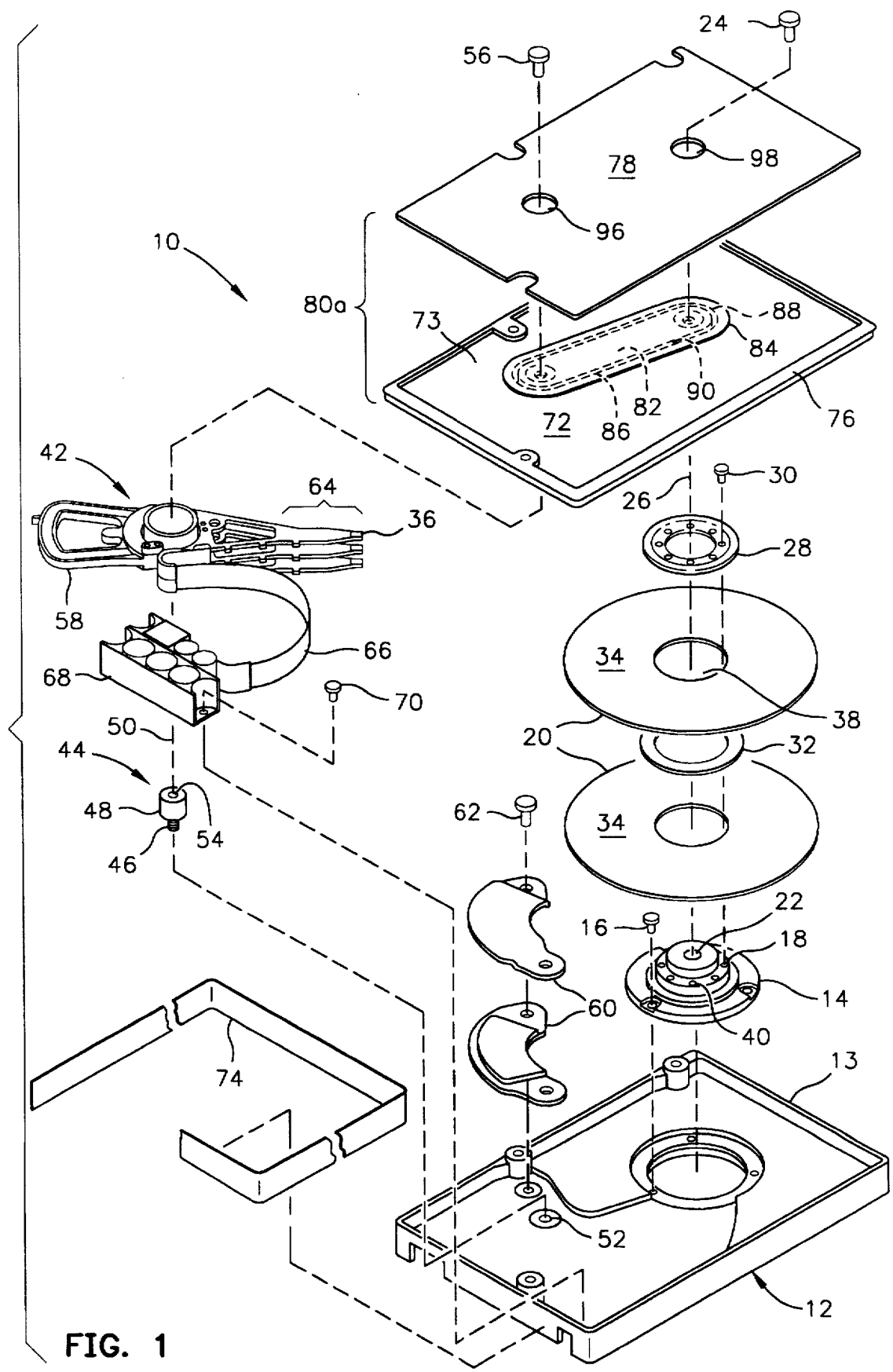
FIG. 1 is an exploded view of a disk drive 10 incorporating the invention.

As shown in FIG. 1, the disk drive 10 of this invention includes a base casting 12 with a generally continuous sidewall 13 for holding the operational components of drive 10. A spindle motor 14 is securably mounted in base 12 by fasteners 16 and includes a rotary spindle hub 18 for rotating at least one recording disk 20 about a stationary spindle journal 22. Spindle journal 22 defines a spindle axis 26 and is fixed to the disk drive housing by means of the fastener 24 in the fashion described below to stabilize spindle axis 26. Disk 20 is fixedly-mounted to spindle hub 18 by a disk clamp 28 and rotates about spindle axis 26. A plurality of fasteners 30 fix disk clamp 28 to spindle hub 18 and a spacer 32 separates one disk 20 from another. Each disk 20 has a recording surface 34 on which information is magnetically recorded by a read/write head 36.

A head-stack assembly (HSA) 42 is mounted for rotary motion with respect to base 12 on a base-mounted pivot bearing assembly 44, which includes a fixed pivot journal 46 and a rotary pivot bushing 48. To establish a pivot axis 50, the bottom of pivot journal 46 is fitted into a complimentary hole 52 in base 12. The top of pivot journal 46 includes another hole 54 for receiving a fastener 56 to stabilize pivot axis 50. HSA 42 includes a coil 58 that, together with the magnetic circuit elements 60, forms a voice coil motor (VCM). A plurality of fasteners 62 secure magnetic circuit elements 60 to base 12. HSA 42 includes a movable arm member 64 for supporting read/write head 36. Spindle motor 14 rotates disk 20 and arm 64 moves head 36 across disk surface 34 to access magnetically-stored data in response to an acceleration current flowing in coil 58. A flex circuit 66 provides for electrical connections between coil 58, read/write head 36 and an electronic controller assembly (not shown), by way of the connector 68 shown attached to base 12 by a fastener 70.

An inner cover 72 encloses these head and disk components in a chamber formed within side-wall 13 of base 12. The invention may be employed with other embodiments of a base and cover used to form a suitable chamber, such as a flat base and a cover with integrally formed sidewalls or other combinations known in the art. The chamber and enclosed components are collectively termed a head-disk assembly (HDA). The inner cover 72 has an outer surface 73 and an opening 86 bounded by an edge 88 in outer surface 73, disposed over the area containing the pivot and spindle journals. An interface member 82 is disposed within opening 86 leaving an air gap 90 to edge 88. A soft metal sealing member 84 seals opening 86. Fasteners 24 and 56 secure interface member 82 to the upper ends of spindle journal 22 and pivot journal 46, respectively. To further seal the HDA chamber against outside contamination, the joint between inner cover 72 and sidewall 13 is covered with a length of sealing tape 74. Inner cover 72 includes an outer peripheral frame 76 forming a receiving area on outer surface 73 for an outer plate 78, which fits therein to form an acoustic barrier for disk drive 10 as one of the noise reduction elements of this invention.

Figure 2:
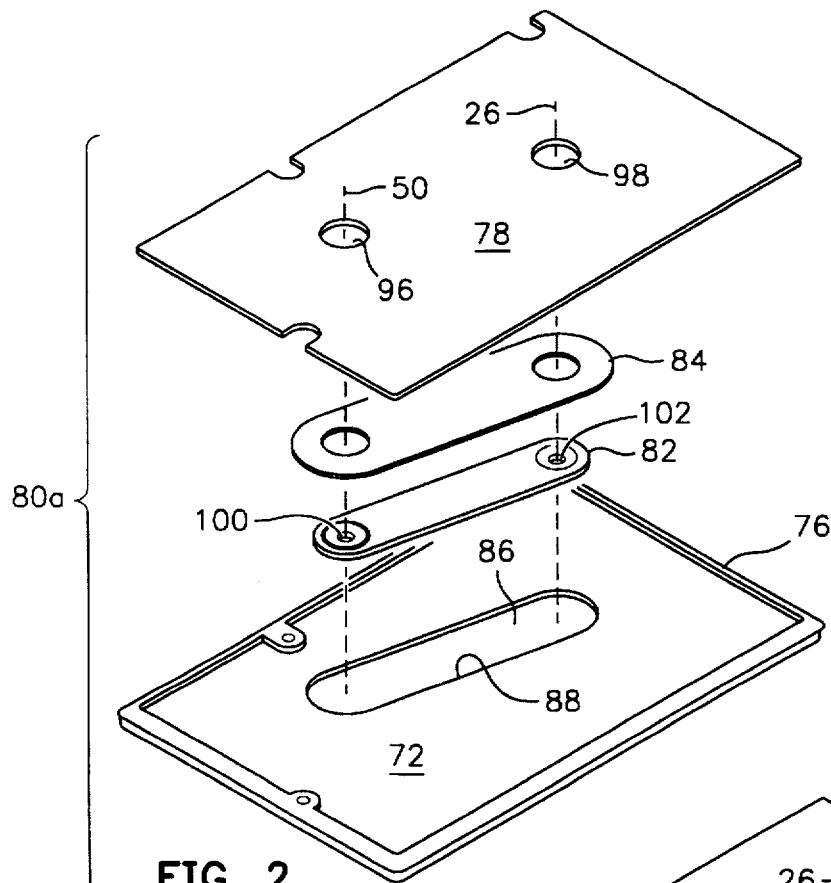
FIG. 2 is an exploded view of a preferred embodiment of the elements required for reduced operational acoustic noise of the disk drive of FIG. 1.
Figure 4:
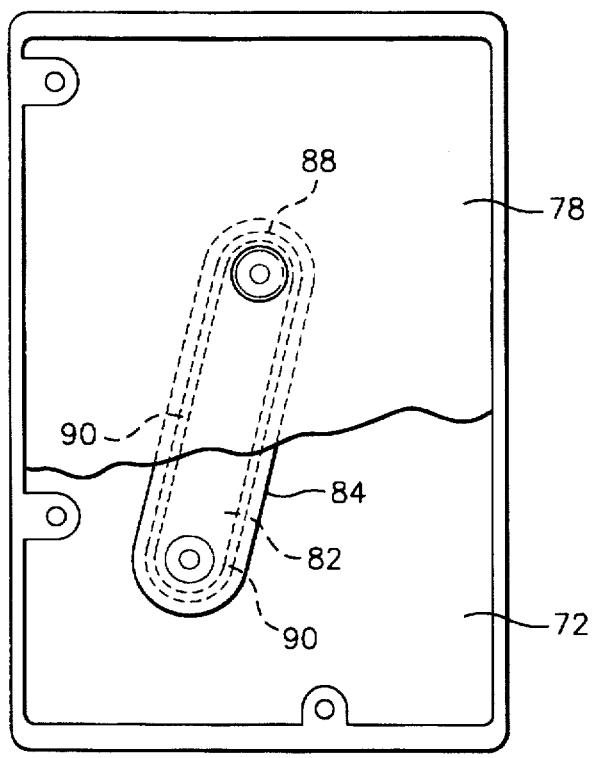
FIG. 4 is a plan (top) and partial cutaway view of the inner cover 72 and noise reduction elements of FIG. 2.
Figure 5:
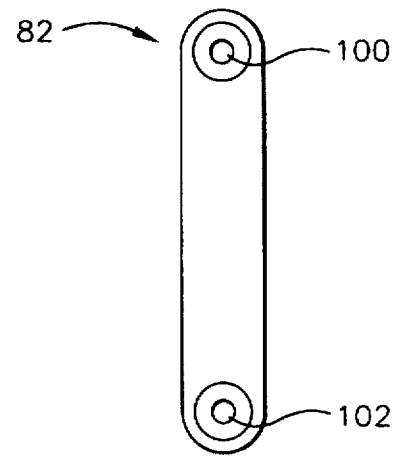
FIG. 5 is a plan (top) view of the interface member 82 of FIG. 4.
Figure 7:
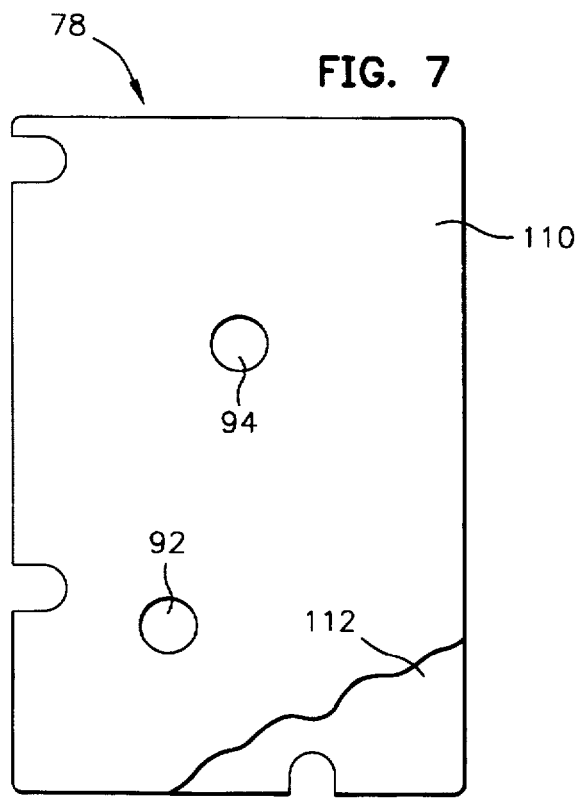
FIG. 7 is a plan (top) and partial cutaway view of an outer plate 78.
Figure 6:
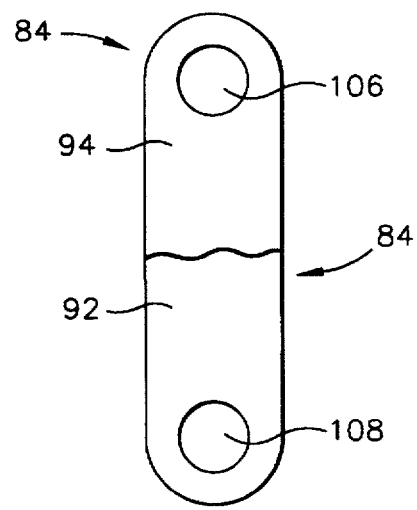
FIG. 6 is a plan (top) and partially cut-away view of a soft metal member 84.
Figure 8:
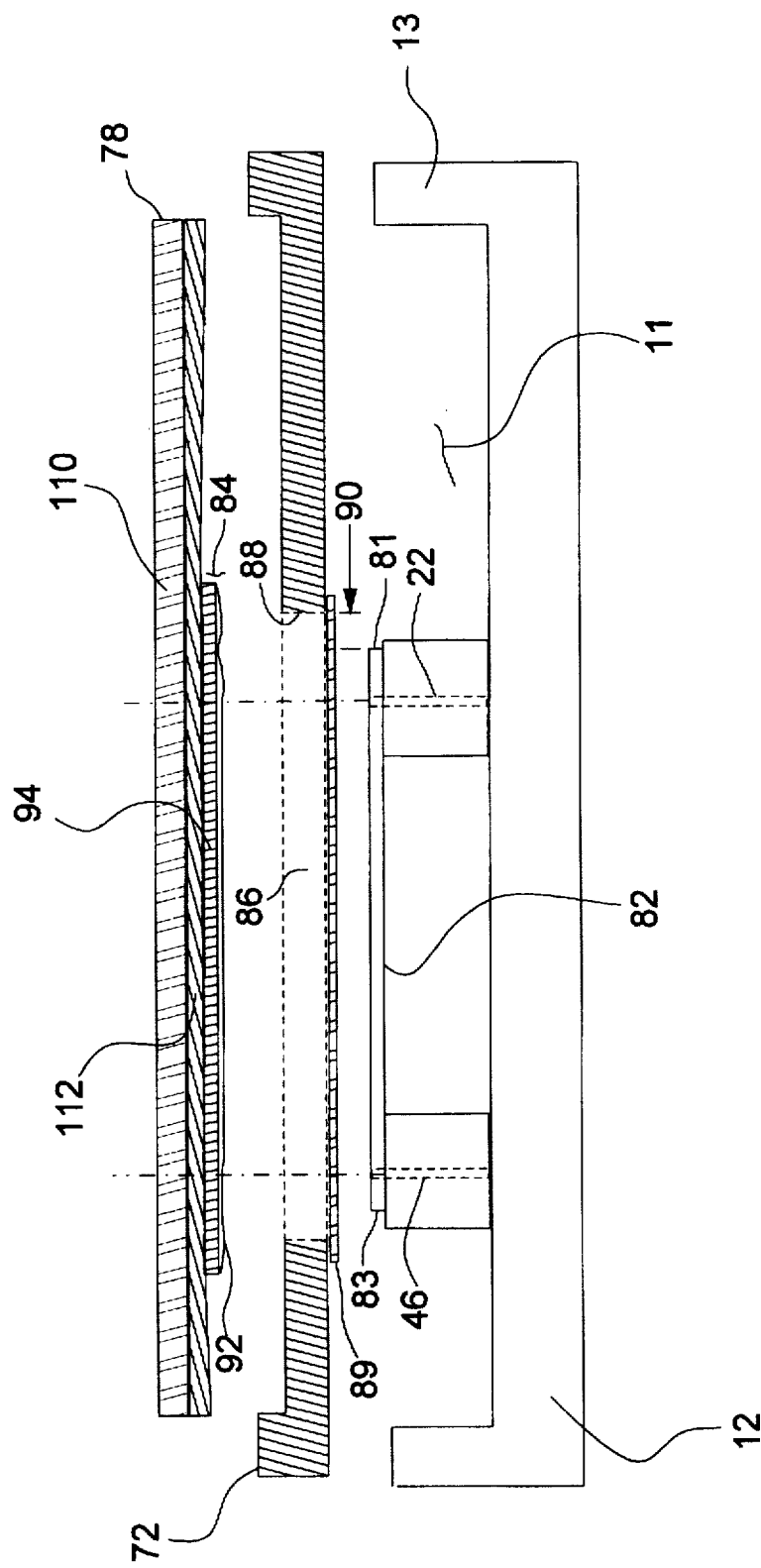
FIG. 8 is a schematic sectional side view of a disk drive incorporating the noise reduction elements according to this invention.

FIG. 2 shows in more detail a preferred embodiment 80a of the elements comprising a noise reduction system of this invention, which includes outer plate 78, rigid interface member 82 and soft metal sealing member 84 disposed between outer plate 78 and interface member 82. Interface member 82 fits within an open region 86 in inner cover 72 and is separated from edge 88 of open region 86 by air gap 90 (FIGS. 4 and 8). Sealing member 84 covers interface member 82 and air gap 90 and surrounds opening 86, thereby sealing the HDA against contamination while also forming a noise reduction element of the invention as discussed in more detail below. As shown in FIG. 2 and 6, sealing member 84 includes an adhesive layer 92 disposed on a soft ("dead soft") metal substrate 94 to attach sealing member 84 to inner cover 72. As shown in FIG. 7, outer plate 78 includes the clearance apertures 94 and 92 for receiving fasteners 24 and 56 therethrough, although fasteners 24 and 56 do not contact outer plate 78. Interface member 82, having free ends 83 and 81 as shown in FIG. 5, includes apertures 100 and 102 for receiving fasteners 24 and 56 therethrough to rigidly couple spindle journal 22 and pivot journal 46 together. Apertures 100 and 102 may be stepped or countersunk so as to be flush with an upper surface of outer plate 78 (with no actual contact between them) when receiving fasteners 24 and 56. Interface member 82 preferably consists of a rigid material such as steel. The rigid coupling to pivot journal 46 allows acoustic vibration energy from HSA 42 to be coupled into interface member 82. External transfer of this unwanted vibration in the form of acoustic noise is substantially reduced by the isolation of interface member from 82 from inner cover 72 via air gap 90 and by the combination of sealing member 84 with cooperating structures discussed below.

FIG. 6 shows sealing member 84 including openings 106 and 108 for receiving therethrough fasteners 24 and 56.

FIG. 4 shows a top cut-away view of outer plate 78 assembled in position over inner cover 72. This may also be appreciated with reference to FIG. 8. Interface member 82 is shown in position under soft metal sealing member 84, surrounded by air gap 90 at edge 88 of open region 86. Air gap 90 isolates interface member 82 from inner cover 72. Importantly, a system of noise reduction elements is provided by sealing member 84 and outer plate 78, which includes a second rigid material layer 110 (FIGS. 7–8) such as steel or aluminum and a viscoelastic damping layer 112. Viscoelastic damping layer 112 is constrained between rigid material layer 110 and the "dead soft" sealing member 84 to provide a means for damping acoustic vibration from interface member 82 through damping by the dead soft layer and dissipation of shear energy in the constrained viscoelastic layer.

FIG. 8 shows an exploded cross section side view of a disk drive 10 including the invention. Respective ends of pivot journal 46 and spindle journal 22 are fixed to base 12 having side-wall 13. HDA chamber 11 is formed when inner cover 72 is fitted to base 12. Interface member 82 is fixed to pivot journal 46 at free end 83, and opposite free end 81 is fixed to spindle journal 22. Interface member 82 fits within open region 86 while isolated from edge 88 of open region 86 in inner cover 72 by air gap 90. Sealing member 84 includes adhesive layer 92 disposed on soft metal substrate 94 to facilitate locating and fixing sealing member 84 to inner cover 72. To ensure that adhesive layer 92 does not contaminate components in inner chamber 11 by any possible outgassing through opening 86, a label 89 may be placed on the underside of inner cover 72. Preferably, soft metal substrate 94 includes a layer of fully-annealed aluminum foil. Sealing member 84 is fixed to the surface of inner cover 72 over open region 86 to surround interface member 82, air gap 90, and edge 88. Outer plate 78 includes second rigid layer 110. Viscoelastic damping layer 112 preferably includes a layer of pressure-sensitive adhesive compound and is constrained between rigid member 110 and soft metal substrate 94, acting to dampen and dissipate acoustic energy received at interface member 82 from any source, such as HSA 42 or spindle motor 14. Constrained viscoelastic damping layer 112 is subjected to shear forces arising from acoustic vibrations in interface member 82, operating as a primary acoustic path in which a significant portion of the acoustic energy received from interface member 82 is dissipated as heat.

Figure 3:
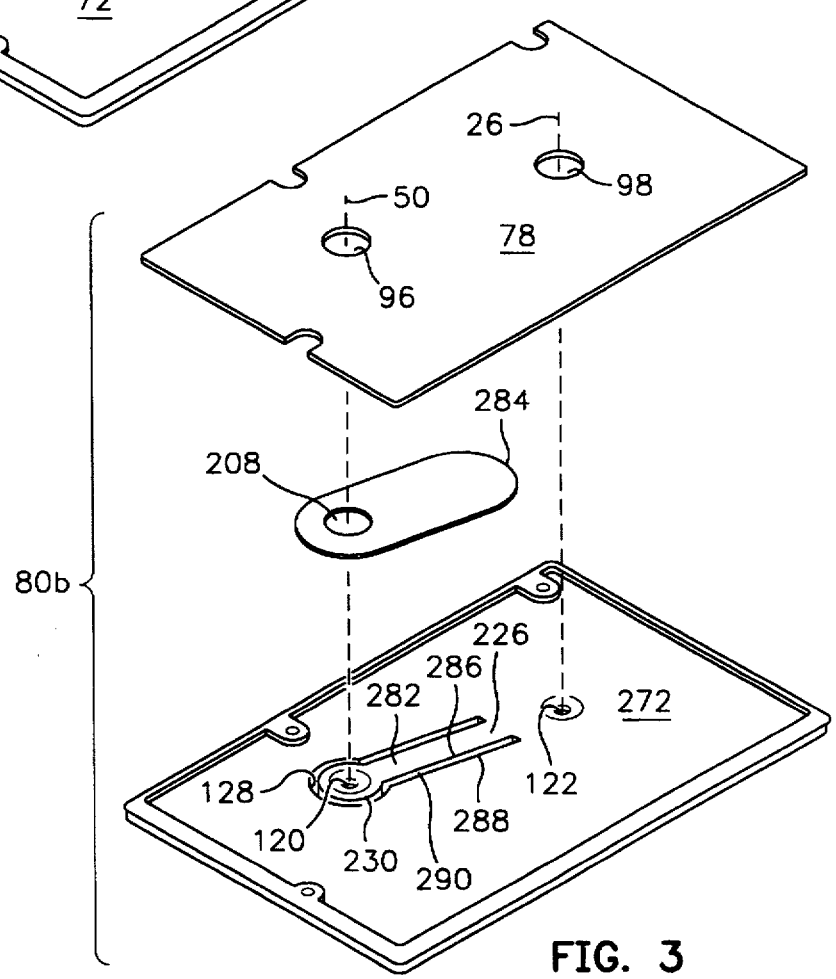
FIG. 3 is an exploded view of an alternative embodiment of the elements required for reduced operational acoustic noise.

FIG. 3 shows an alternative embodiment 80b of this invention. The analogous sealing member 284 includes a pressure-sensitive adhesive material disposed on a soft metal substrate just a like sealing member 84 of embodiment 80a. Preferably, the soft metal substrate includes a material such as fuilly-annealed aluminum foil. The analogous interface member 282 is cantilevered from and thus only partially isolated from the analogous inner cover 272 and includes a free end 283 having a single aperture 200 for receiving single fastener 56 (FIG. 1) for coupling to pivot journal 46. Interface member 282 is fixed to pivot journal 46 in the same way that interface member 82 is fixed to pivot journal 46 in FIG. 2. Pivot journal 46 is thereby held in fixed disposition with respect to spindle journal 22 because spindle journal 22 is fixed to inner cover 272 outside of the open region by means of second fastener 24 (FIG. 1) through the inner cover aperture 202. Sealing member 284 is disposed between interface member 282 and outer plate 78 and includes an aperture 208 for receiving the pivot journal fastener 56 therethrough. As discussed above, outer plate 78 has two apertures 98 and 96 for receiving therethrough fasteners 24 and 56, respectively.

Interface member 282 is disposed within open region 286 having edge 288 in inner cover 272 except that a proximate portion 226 at one end is joined integrally to inner cover 272. An analogous air gap 290 defines an "open region" about cantilevered interface member 282. Thus, interface member 282 is an integral part of inner cover 272 extending into the open region defined by edge 288 and therefore preferably includes the same rigid material used in inner cover 272, such as steel. Interface member 282 receives acoustic vibrations from HSA 42 as it moves in response to current in coil 58. Sealing member 284 fits over interface member 282 of inner cover 272 to seal the HDA just as sealing member 84 fits over interface member 82 and inner cover 72 in FIG. 1.

Interface member 282 has a distal portion 230 of a first width w, disposed near the pivot axis and proximate portion 226 of a second width $w_2$ at the joinder with inner cover 282. The relationship between the length L of interface member 282 and the relative widths ($w_1$, $w_2$) is selected to attenuate acoustic vibration energy transfer from distal portion 230 to inner cover 282 within a predetermined frequency region, such as between 200 Hz and 4000 Hz. This result is accomplished by presenting a high acoustic impedance magnitude at such frequencies to the pivot journal 46, causing such acoustic vibration energy to be reflected instead of transferred from pivot journal 46 to inner cover 272.

It is well known that any article has particular acoustical characteristics that are a function of distributed mass, density, shape and certain material properties such as Young's modulus or sound velocity for the particular article. In a preferred embodiment of this invention, the rigid material layers in inner cover 272 and interface member 282 are composed of a stainless steel 21 alloy. Thus, for a given mass, material, and thickness, the length and width distribution of interface member 282 may be selected to achieve the desired acoustic isolation at particular frequencies. Measurement of the acoustic impedance of interface member 282 is useful for selecting design dimensions for $w_1$ and $w_2$. When interface member 282 is embodied with the necessary length and widths, acoustic energy in a predetermined frequency region should be attenuated by 40 dB or more. Thus, although interface member 282 is not entirely isolated from inner cover 272 by a (high acoustic impedance) air gap such as air gap 90 (FIG. 4), the physical characteristics of interface member 282 provide the same high acoustic impedance within a selected frequency region for alternative embodiment 80b, thereby blocking transfer of unwanted acoustic energy from pivot journal 46 to inner cover 272 with effectiveness similarly useful to the blocking action of air gap 90 in preferred embodiment 80a.

An acoustic noise suppression system for a disk drive for reducing operational acoustic noise and for attenuating noise energy within a predetermined frequency range is now disclosed. Other embodiments for practicing this invention may occur readily to those skilled in the art in view of these teachings so this invention is limited only by the appended claims.

We claim:

1. A disk drive having reduced operational acoustic noise, the disk drive comprising:

a base with a substantially continuous sidewall;

an inner cover that is substantially flat and that has a periphery joined to the base to form a head-disk assembly (HDA) chamber, the inner cover including a first layer of rigid material with an open region that is spaced from the periphery and that is bounded by an open-region edge;

a pivot bearing assembly having a pivot journal;

the pivot journal having a first pivot end and a second pivot end, the first pivot end being fixed to the base to define a pivot axis disposed within the open region of the inner cover;

a head stack assembly rotatably supported by the pivot bearing assembly, the head stack assembly being a source of undesirable acoustic vibration energy;

a spindle motor having a spindle journal;

the spindle journal having a first spindle end and a second spindle end, the first spindle end being fixed to the base to define a spindle axis in parallel relationship with the pivot axis;

an interface member having a free end, the interface member disposed within the open region substantially coplanar to the open region edge;

the interface member being attached to the second end of the pivot journal and to the second end of the spindle journal to fix and stabilize the parallel relationship of the spindle axis and the pivot axis, with the free end being spaced from the open-region edge by an air gap to provide isolation of the free end to reduce transfer of acoustic vibration energy:

pivot-to-interface attachment means for attaching the free end to the second end of the pivot journal;

means for supporting the interface member and attaching the interface member to the second end of the spindle journal;

an outer plate fixed to the inner cover and including a second layer of rigid material; and a soft metal member disposed between the interface member and the outer plate to surround the open region;

a layer of viscoelastic material constrained between the soft metal member and the second rigid material layer whereby acoustic vibration from the interface member is dissipated within the constrained viscoelastic material; and the pivot-to-interface attachment means including a fastener and an aperture in the outer plate through which the fastener extends into the second end of the pivot journal without contacting the outer plate so as to maintain the isolation of the free end.

2. The disk drive of claim 1 wherein the soft metal substrate comprises fullly-annealed aluminum foil.

3. The disk drive of claim 1 wherein:

the first layer of rigid material includes the interface member; and the interface member extends for a length L into the open region from the edge thereof to where the interface member is fixed to the pivot journal, the interface member having a first width $w_1$ at a proximate end adjacent the edge of the open region and a second width $w_2$ at a distal end adjacent the pivot journal, wherein the length L is more than twice the first width $w_1$ and more than twice the second width $w_2$, whereby acoustic vibrations in the pivot interface member are attenuated during transfer to the inner cover.

4. The disk drive of claim 3 wherein the soft metal substrate comprises:

fuully-annealed aluminum foil.

5. The disk drive of claim 1 wherein the first rigid material layer comprises steel.

6. The disk drive of claim 5 wherein the second rigid material layer comprises steel.

7. The disk drive of claim 6 wherein the interface member comprises steel.

* * * * *